United States Patent
Menendez et al.

(10) Patent No.: US 9,463,989 B2
(45) Date of Patent: Oct. 11, 2016

(54) SYNERGISTIC METHOD FOR ENHANCED H₂S/MERCAPTAN SCAVENGING

(75) Inventors: Carlos M. Menendez, Houston, TX (US); Vladimir Jovancicevic, Richmond, TX (US); Sunder Ramachandran, Sugar Land, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 1120 days.

(21) Appl. No.: 13/527,822

(22) Filed: Jun. 20, 2012

(65) Prior Publication Data
US 2013/0004393 A1    Jan. 3, 2013

Related U.S. Application Data

(60) Provisional application No. 61/502,511, filed on Jun. 29, 2011.

(51) Int. Cl.

| | | |
|---|---|---|
| *B01D 53/48* | (2006.01) | |
| *B01D 53/52* | (2006.01) | |
| *B01D 53/76* | (2006.01) | |
| *B01D 53/77* | (2006.01) | |
| *B01D 53/78* | (2006.01) | |
| *B01D 19/00* | (2006.01) | |
| *C02F 1/68* | (2006.01) | |
| *B01D 53/79* | (2006.01) | |
| *C02F 101/10* | (2006.01) | |

(52) U.S. Cl.
CPC .......... *C02F 1/683* (2013.01); *B01D 19/0005* (2013.01); *B01D 53/485* (2013.01); *B01D 53/52* (2013.01); *B01D 53/79* (2013.01); *B01D 2251/21* (2013.01); *B01D 2257/304* (2013.01); *B01D 2257/306* (2013.01); *C02F 2101/101* (2013.01)

(58) Field of Classification Search
None
See application file for complete search history.

(56) References Cited

U.S. PATENT DOCUMENTS

| | | |
|---|---|---|
| 1,783,901 A | 12/1930 | Bottoms |
| 1,991,765 A | 2/1935 | Marks |
| 2,496,596 A | 2/1950 | Moyer et al. |
| 2,550,446 A | 4/1951 | Blohm et al. |
| 2,596,273 A | 5/1952 | Moyer et al. |

(Continued)

FOREIGN PATENT DOCUMENTS

| | | |
|---|---|---|
| EP | 0411745 A1 | 2/1991 |
| GB | 2290542 A | 1/1996 |

OTHER PUBLICATIONS

Derwent Abstract 115:95451c (1991) of S.P. Von Halasz et al., Erdoel, Erdgas, Kohle 1991, 107(5), pp. 215-220 (German).

*Primary Examiner* — Daniel Berns
(74) *Attorney, Agent, or Firm* — Mossman Kumar & Tyler PC

(57) ABSTRACT

The use of a dialdehyde (e.g. glyoxal) and a nitrogen-containing scavenger (e.g. a triazine) when injected separately in media containing hydrogen sulfide (H₂S) and/or mercaptans to scavenge H₂S and/or mercaptans therefrom gives a synergistically better reaction rate and overall scavenging efficiency, i.e. capacity, over the use of the dialdehyde or the nitrogen-containing scavenger used alone, but in the same total amount of the dialdehyde and nitrogen-containing scavenger. The media may include an aqueous phase, a gas phase, a hydrocarbon phase and mixtures of a gas and/or hydrocarbon phase with an aqueous phase.

5 Claims, 3 Drawing Sheets

(56) References Cited

U.S. PATENT DOCUMENTS

| | | |
|---|---|---|
| 2,596,425 A | 5/1952 | Moyer et al. |
| 2,701,450 A | 2/1955 | Duncan |
| 2,712,978 A | 7/1955 | Blohm et al. |
| 2,718,454 A | 9/1955 | Wylie |
| 2,731,393 A | 1/1956 | Arundale et al. |
| 2,761,818 A | 9/1956 | Draemel et al. |
| 2,776,870 A | 1/1957 | Fischer |
| 2,860,030 A | 11/1958 | Goldtrap et al. |
| 3,120,993 A | 2/1964 | Thormann et al. |
| 3,266,866 A | 8/1966 | Bally et al. |
| 3,347,621 A | 10/1967 | Papadopoulos et al. |
| 3,387,917 A | 6/1968 | Walles et al. |
| 3,420,633 A | 1/1969 | Lee |
| 3,463,603 A | 8/1969 | Freitas et al. |
| 3,502,428 A | 3/1970 | Gelbein et al. |
| 3,516,793 A | 6/1970 | Renault |
| 3,791,974 A | 2/1974 | Borchert |
| 4,436,713 A | 3/1984 | Olson |
| 4,443,423 A | 4/1984 | Olson |
| 4,680,127 A | 7/1987 | Edmondson |
| 4,748,011 A | 5/1988 | Baize |
| 4,892,719 A | 1/1990 | Gesser |
| 4,894,178 A | 1/1990 | Ho et al. |
| 5,085,842 A | 2/1992 | Porz et al. |
| 5,128,049 A | 7/1992 | Gatlin |
| 5,152,916 A | 10/1992 | Hoffmann et al. |
| 5,169,411 A | 12/1992 | Weers |
| 5,190,640 A | 3/1993 | Roof et al. |
| 4,978,512 B1 | 6/1993 | Dillon |
| 5,314,672 A | 5/1994 | Vasil |
| 5,347,004 A | 9/1994 | Rivers et al. |
| 5,462,721 A | 10/1995 | Pounds et al. |
| 5,480,860 A | 1/1996 | Dillon |
| 5,488,103 A | 1/1996 | Gatlin |
| 5,554,349 A | 9/1996 | Rivers et al. |
| 5,674,377 A | 10/1997 | Sullivan, III et al. |
| 5,688,478 A | 11/1997 | Pounds et al. |
| 5,698,171 A | 12/1997 | Trauffer et al. |
| 5,744,024 A | 4/1998 | Sullivan, III et al. |
| 5,958,352 A | 9/1999 | Callaway et al. |
| 5,980,845 A * | 11/1999 | Cherry ............... B01D 53/1468 208/236 |
| 5,074,991 C1 | 5/2001 | Weers et al. |
| 6,582,624 B2 | 6/2003 | Titley et al. |
| 6,663,841 B2 | 12/2003 | Salma et al. |
| 2005/0238556 A1 | 10/2005 | Pakulski et al. |
| 2005/0250666 A1 | 11/2005 | Gatlin et al. |
| 2009/0065445 A1 | 3/2009 | Westlund et al. |
| 2011/0271835 A1 | 11/2011 | Westlund et al. |
| 2012/0088697 A1 | 4/2012 | Gatlin et al. |

* cited by examiner

SYNERGISTIC METHOD FOR ENHANCED H₂S/MERCAPTAN SCAVENGING

CROSS-REFERENCE TO RELATED APPLICATION

This application claims the benefit of U.S. Provisional Patent Application Ser. No. 61/502,511 filed Jun. 29, 2011, incorporated herein by reference in its entirety.

TECHNICAL FIELD

The present invention relates to methods and compositions for scavenging $H_2S$ and/or mercaptans from fluids, and more particularly relates, in one non-limiting embodiment, to methods and compositions for scavenging $H_2S$ and/or mercaptans from fluids using a dialdehyde and a nitrogen-containing scavenger.

TECHNICAL BACKGROUND

In drilling, downhole completion, production, transport, storage, and processing of crude oil and natural gas, including waste water associated with crude oil and gas production, and in the storage of residual fuel oil, $H_2S$ and/or mercaptans are often encountered. The presence of $H_2S$ and mercaptans is objectionable because they often react with other hydrocarbons or fuel system components. Another reason that the $H_2S$ and mercaptans are objectionable is that they are often highly corrosive. Still another reason that $H_2S$ and mercaptans are undesirable is that they have highly noxious odors. The odors resulting from $H_2S$ and mercaptans are detectable by the sense of smell at comparatively low concentrations and are well known. For example, mercaptans are used to odorize natural gas and used as a repellant by skunks and other animals.

The predominant $H_2S$ and mercaptan scavengers for natural gas and crude oil are monoethanolamine (MEA) and monomethylamine (MMA) triazines. The use of triazines to scavenge $H_2S$ and mercaptan scavengers is described in U.S. Pat. Nos. 5,347,004; 5,554,349; 5,958,352; and 6,663,841 assigned to Baker Hughes Incorporated, all of which are incorporated herein by reference.

The dialdehyde glyoxal ($C_2H_2O_2$) and the aldehyde acrolein ($C_3H_4O$) have been used as $H_2S$ scavengers in these instances. Glyoxal may be corrosive to mild steel under some conditions. Acrolein is an extremely toxic substance which operators do not like to use.

It would be desirable if new $H_2S$ and/or mercaptan scavengers or new synergistic combinations of old $H_2S$ and mercaptan scavengers could be discovered which are very effective, but which overcomes the deficiencies of prior scavengers.

SUMMARY

There is provided in one non-restrictive version, a method for scavenging hydrogen sulfide and/or mercaptans from media that includes, but is not necessarily limited to, an aqueous phase, a gas phase, a hydrocarbon phase and mixtures of a gas and/or hydrocarbon phase with an aqueous phase, which media also comprises hydrogen sulfide and/or mercaptans. The method involves contacting the media separately with an effective amount for synergistically scavenging hydrogen sulfide and/or mercaptans of at least one dialdehyde, and an effective amount for synergistically scavenging hydrogen sulfide and/or mercaptans of at least one nitrogen-containing scavenger. The at least one dialdehyde and the at least one nitrogen-containing scavenger are not mixed together prior to each separately contacting the media. The amount of hydrogen sulfide and/or mercaptans scavenged is greater as compared with a method of contacting the media with at least one dialdehyde alone and a method of contacting the media with at least one nitrogen-containing scavenger alone, where they are separately used in equal total amounts as the combined effective amount of the dialdehyde and the nitrogen-containing scavenger.

Figure 1:
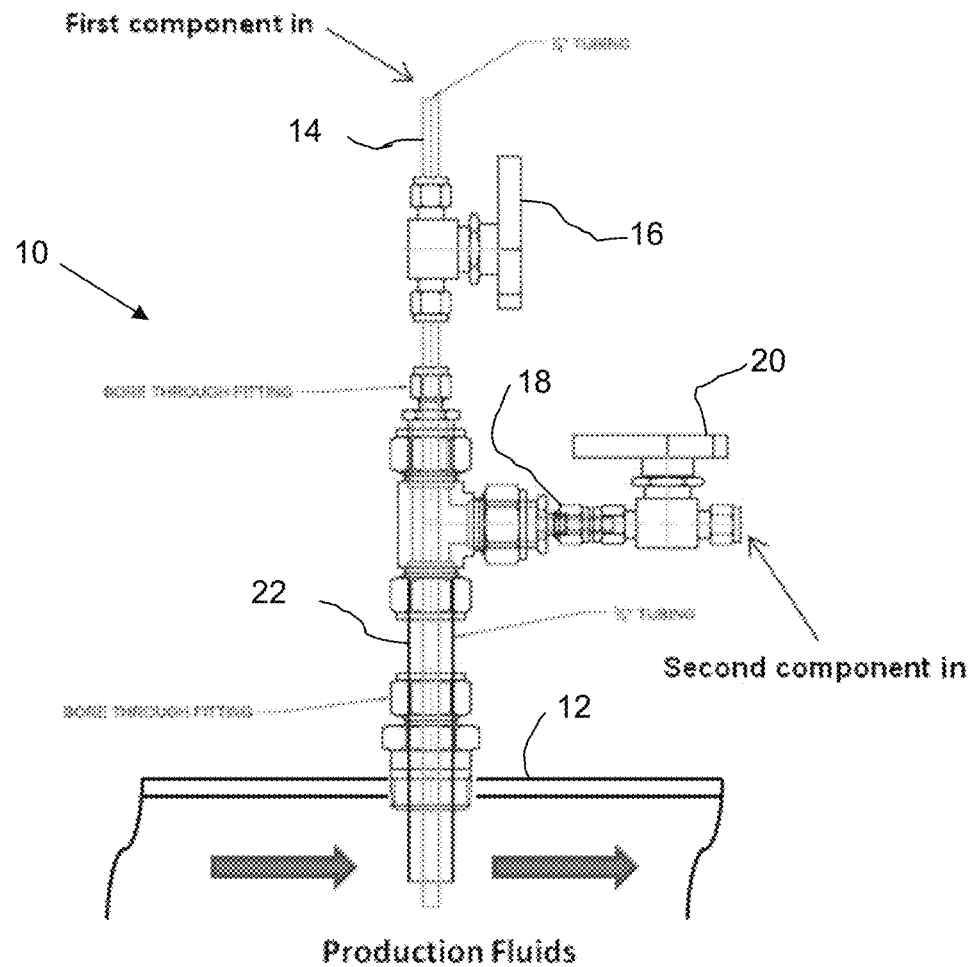
FIG. 1 is a schematic diagram of a specially designed valve equipped with two separate injection lines for injecting a dialdehyde and a nitrogen-containing scavenger separately into a flowing production fluid.

It will be understood that FIG. 1 is not necessarily shown to scale or proportion, and that certain features may be exaggerated for clarity, and that any simplifications or exaggerations do not limit the methods described herein.

DETAILED DESCRIPTION

It has been surprisingly discovered that a synergistic in-situ combination of glyoxal and triazine-based hydrogen sulfide scavengers may remove $H_2S$ present in wet natural gas, oil and aqueous solutions, such as brine. The method involves removing $H_2S$ in natural gas, oil, aqueous solutions and combinations thereof by a synergistic combination of a dialdehyde, such as glyoxal, and a conventional nitrogen-containing scavenger, such as a triazine, by injecting them separately into the gas, gas/water, oil and oil/water streams. The mixing of the components, if any, occurs in the stream. The resulting in-situ formed scavenger mixture significantly increases the reaction rate and the overall scavenging efficiency, as compared to using either the dialdehyde or the nitrogen-containing scavenger separately, but in the same proportions. It has been surprisingly singly discovered that if the dialdehyde and the nitrogen-containing scavenger are injected together, particularly when they are glyoxal and a triazine, that a reaction product is formed that does not work to effectively scavenge $H_2S$, in one non-limiting embodiment.

More particularly, the method involves the effective removal of $H_2S$ and/or mercaptans (collectively known as sulfur-containing compounds) from various media including, but not necessarily limited to, hydrocarbon phases (e.g. oil and natural gas) and water phases (e.g. brines) and mixtures thereof by introducing a combination of a dialdehyde and a nitrogen-containing scavenger into the fluid, but by co-injecting them without contacting them with each other prior to being diluted in the fluid to form a synergistic mixture, while largely avoiding forming a reaction product between the two. It will be understood that a small portion of a reaction product may form within the fluid, but in most cases it is not expected that so much reaction product is formed that it will adversely affect the scavenging method.

Besides glyoxal, other dialdehydes expected to be useful in the method described herein include, but are not necessarily limited to, malondialdehyde, succindialdehyde, glutaraldehyde, phthaldialdehyde, and the like, and combinations thereof.

Suitable nitrogen-containing scavenger include, but are not necessarily limited to, triazines (e.g. hexahydrotriazines made by reacting formaldehyde with an alkanolamine such as monoethanolamine (MEA), and other triazines made using an alkylamine such as monomethylamine, and an alkoxyalkylamine such as 3-methoxypropylamine (MOPA) etc.); where other suitable nitrogen-containing scavengers include monomethylamine (MMA); monoethylamine; dimethylamine; dipropylamine; trimethylamine; triethylamine; tripropylamine; monomethanolamine; dimethanolamine; trimethanolamine; diethanolamine (DEA); triethanolamine (TEA); monoisopropanolamine; dipropanolamine; diisopropanolamine; tripropanolamine; N-methylethanolamine; dimethyl ethanol amine; methyl diethanolamine; dimethyl amino ethanol; diamines, such as of those of U.S. Pat. No. 5,074,991, incorporated by reference herein it its entirety; imines; imidazolines; hydroxy amino alkyl ethers; morpholines; pyrrolidones; piperidones; alkylpyridines; aminomethylcyclopentylamine; 1-2-cyclohexanediamine; 1,5-pentanediamine; 1,6-hexanediamine; 1H-azepine, hexahydro; 1,4-butanediamine; alkylene polyamine/formaldehyde reaction products; bis-(tertiarybutylaminoethoxy)-ethane (BTEE); ethoxyethoxyethanoltertiarybutylamine (EEETB); polyvalent metal chelates of aminocarboxylic acids; quaternary ammonium salts; polyethylenimine; polyallylamine; polyvinylamine; aminocarbinols; aminals; bisoxazolidines; reaction products of ethylene diamine with formaldehyde such as those of U.S. Pat. No. 5,314,672 incorporated by reference herein it its entirety; N-butylamine formaldehyde reaction product, and combinations thereof. In another non-limiting embodiment, monoethanolamine (MEA) is absent.

The weight ratio of dialdehyde to nitrogen-containing scavenger may range from about 5/95 independently to about 95/5, where the dialdehyde is in a 40 wt % aqueous solution, alternatively from about 25/75 independently to about 75/25, and alternatively from about 40/60 independently to about 60/40. The term "independently" when used herein in connection with a range means that any lower threshold may be combined with any upper threshold to give a valid alternative range.

In specific applications to remove $H_2S$ from crude oil or other fluid, the hydrogen sulfide/mercaptan scavenger, that is, a combined effective amount of dialdehyde and effective amount of nitrogen-containing scavenger, ranging from about 1 independently to about 100,000 ppm may be introduced into the fluid, alternatively from about 100 independently to about 10,000 ppm, alternatively from about 50 independently to about 5,000 ppm.

In an alternative embodiment, surfactants may be optionally used together with the dialdehyde or together with the nitrogen-containing scavenger. The surfactants may help disperse the $H_2S$/mercaptan scavengers in the fluid. Suitable non-nitrogen-containing surfactants include, but are not necessarily limited to, alkoxylated alkyl alcohols and salts thereof and alkoxylated alkyl phenols and salts thereof, alkyl and aryl sulfonates, sulfates, phosphates, carboxylates, polyoxyalkyl glycols, fatty alcohols, polyoxyethylene glycol sorbitan alkyl esters, sorbitan alkyl esters, polysorbates, glucosides, and the like, and combinations thereof. Suitable other surfactants may include, but are not necessarily limited to, quaternary amine compounds, amine oxide surfactants, and the like.

Suitable solvents for the $H_2S$/mercaptan scavenger compositions herein include, but are not necessarily limited to, water, formamide, propylene carbonate, tetrahydrofuran, alcohols, glycols and mixtures thereof alone or without water. Suitable alcohols include methanol and ethanol. Ethylene glycol may also be used as a solvent during the winter months for antifreeze purposes.

The method may be achieved in one non-limiting embodiment using a valve 10 as shown in FIG. 1, where valve 10 intersects and is connected to a conduit 12 of flowing fluid, such as production fluids previously described. The valve 10 has a first injection line 14 with its first valve 16 and a second injection line 18 with its respective second valve 20. First injection line 14 and second injection line 18 meet in common injection line 22 that feeds conduit 12. It does not matter if the dialdehyde or the nitrogen-containing scavenger is the first component (injected via first injection line 14) or the second component (injected via second injection line 18) as long as the components are not mixed with each other prior to injection into the fluid of conduit 12, for instance inside common injection line 22. Any mixing of a subsequent component with residual initial component in the valve 10 may be considered to be negligible. Alternatively, or in addition to, the apparatus shown in FIG. 1 and described above, there may be an injection point or multiple injection points in conduit 12 for each of the dialdehyde and the nitrogen-containing scavenger.

It is expected that these methods and compositions may be used to remove hydrogen sulfide present in natural gas produced from natural gas wells, including where the media is a gas phase. They may also be used to remove hydrogen sulfide from crude oil. Additionally they may be used to remove hydrogen sulfide from brines containing hydrogen sulfide. Accordingly, these compositions and methods may be advantageously used in refineries, waste water and produced water treatment plants, facilities that manufacture hydrogen, and other industrial processes.

When the method scavenges $H_2S$ and/or mercaptans from a gaseous phase, the method may be practiced by contacting the gaseous phase with droplets of the two types of scavengers. With respect to removing $H_2S$ and/or mercaptans from a gaseous phase, the dialdehyde compound is present in the composition in a concentration of at least 10 vol %, alternatively at least 20 vol %, alternatively at least 50 vol %, alternatively at least 70 vol %, alternatively at least 90 vol %, and alternatively at least 95 vol %, whereas the nitrogen-containing scavenger may be used independently in similar proportions, but not necessarily in the same proportions as the dialdehyde.

The scavenging compositions described herein may also include corrosion inhibitors including, but not necessarily limited to, phosphate esters, acetylenic alcohols, fatty acids and/or alkyl-substituted carboxylic acids and anhydrides, quaternary amines, sulfur-oxygen phosphates and/or polyphosphate esters.

The invention will now be illustrated with respect to certain examples which are not intended to limit the invention in any way but simply to further illustrate it in certain specific embodiments.

Example 1

Figure 2:
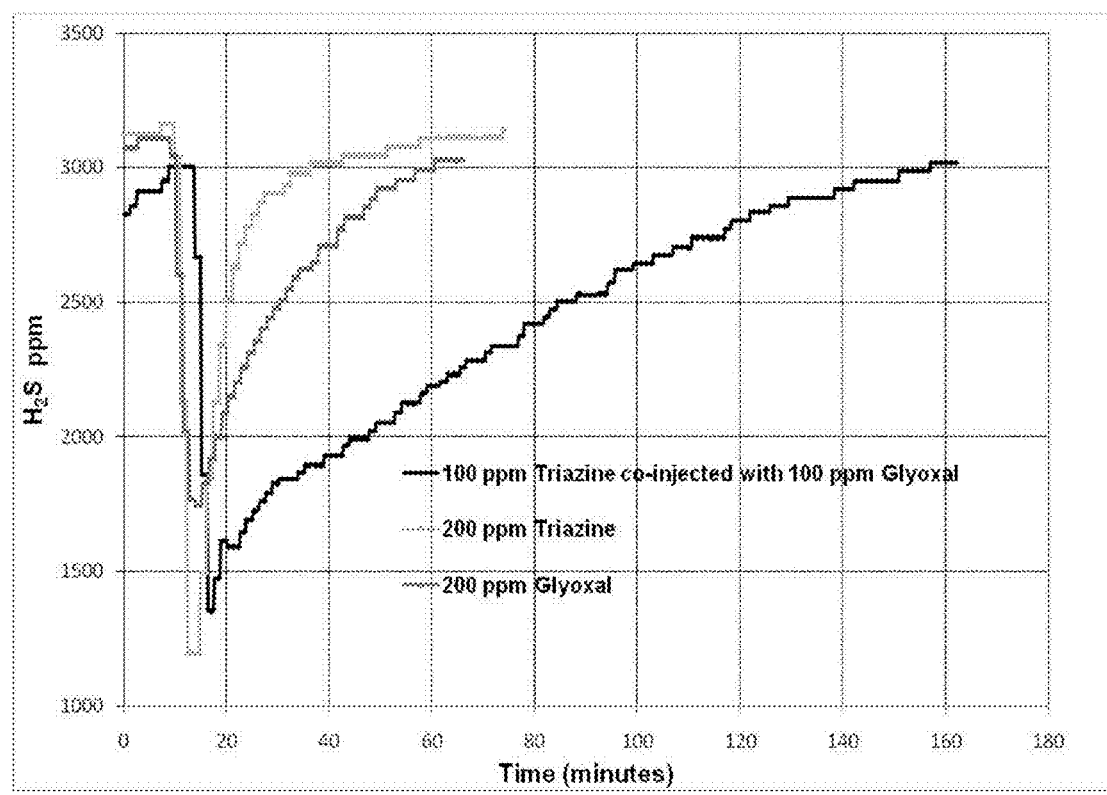
FIG. 2 is a graph showing the difference between the concentration of $H_2S$ gas sparged through a brine solution and the exiting $H_2S$ concentration of gas over time after a fixed amount of glyoxal and triazine are separately co-injected as compared to when glyoxal and the triazine are each injected alone, but in equivalent amounts.

Shown in FIG. 2 is a graph of the difference between the concentration of $H_2S$ gas sparged through a brine solution and the exiting $H_2S$ concentration of gas over time after a fixed amount of glyoxal and triazine are separately co-injected as compared to using glyoxal and the triazine each injected alone, but in equivalent amounts. That is, the use of 200 ppm monoethanolamine (MEA) triazine alone gave the greatest initial drop in $H_2S$, but the $H_2S$ levels recovered more quickly. The use of 200 ppm glyoxal alone did not cause as great an initial drop in $H_2S$ level, but suppressed $H_2S$ at a lower level for longer than did the 200 ppm triazine alone. However, the use of 100 ppm of this triazine injected separately from 100 ppm glyoxal ("co-injected", but injected separately from one another, for a total of 200 ppm) gave the longest lasting results in that $H_2S$ was suppressed at a lower level over a longer period of time as compared with contacting the fluid with the separate components in equal total amounts.

It can thus be seen from the graph of FIG. 2 that the separate co-injection of glyoxal and triazine synergistically increases the amount of $H_2S$ scavenged using glyoxal or triazine separately. The new scavenging method offers significantly enhanced efficiency due to the strong synergistic effect between the two components in liquid solutions.

Example 2

Figure 3:
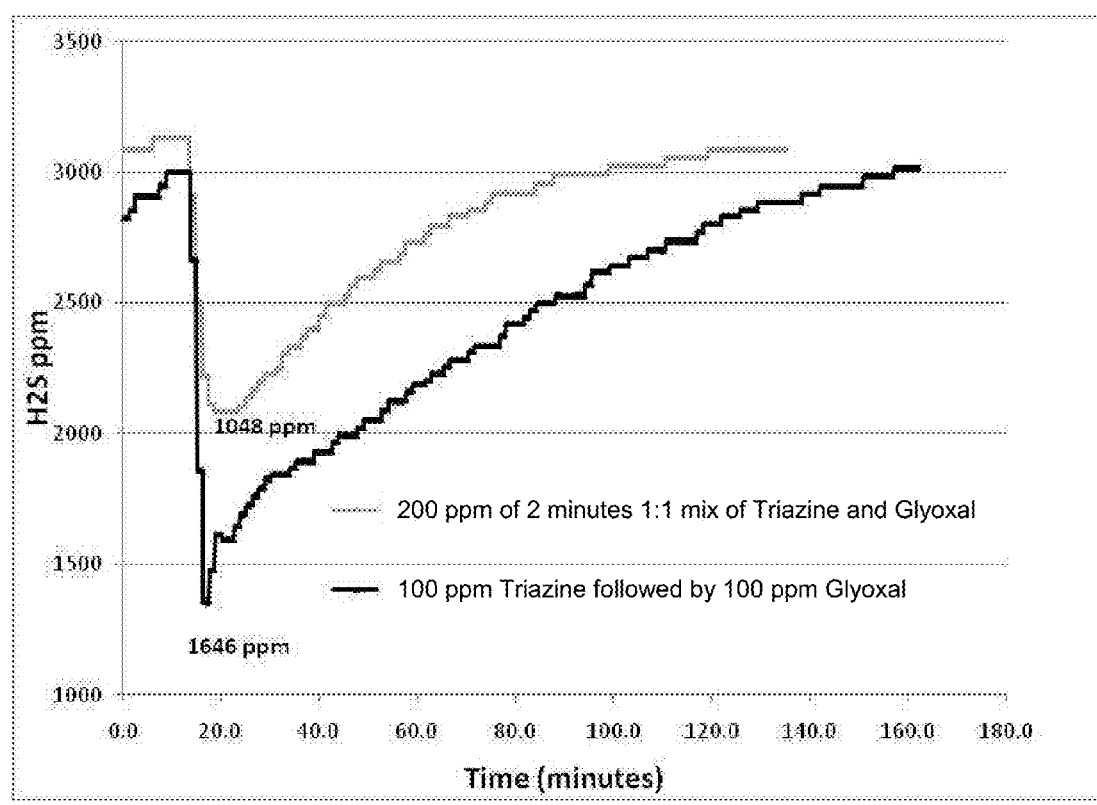
FIG. 3 is a graph showing the difference between the concentration of $H_2S$ gas sparged through a brine solution and the exiting $H_2S$ concentration of gas over time after a fixed amount of glyoxal and triazine are separately co-injected as compared to when glyoxal and the triazine are mixed together and injected, but in equivalent amounts.

Shown in FIG. 3 are graphs comparing the results from using 200 ppm of a 1:1 mixture of MEA triazine with glyoxal that had been mixed for two minutes with the separate co-injection of 100 ppm MEA triazine followed by 100 ppm glyoxal (the same graph as in FIG. 2). It may be seen that when these components are injected as a mixture, the level of $H_2S$ was initially reduced by only 1048 ppm as compared to the separate injection of the components where the level of $H_2S$ was initially reduced by 1646 ppm. Further, it may be seen that when the components are mixed prior to injection, the $H_2S$ levels recovers more quickly and completely as compared to the graph when the components are separately injected. This comparison demonstrates that it is better not to mix the components prior to injection; a reaction product resulting from the mixture is inferred in one non-limiting embodiment.

In the foregoing specification, the invention has been described with reference to specific embodiments thereof, and has been demonstrated as effective in providing methods and compositions for scavenging $H_2S$ and/or mercaptans from aqueous fluids, hydrocarbon fluids, gaseous phases and/or combinations thereof. However, it will be evident that various modifications and changes can be made thereto without departing from the broader spirit or scope of the invention as set forth in the appended claims. Accordingly, the specification is to be regarded in an illustrative rather than a restrictive sense. For example, specific dialdehydes, nitrogen-containing scavengers, and optional surfactants and solvents falling within the claimed parameters, but not specifically identified or tried in a particular composition or method, are expected to be within the scope of this invention.

The words "comprising" and "comprises" as used throughout the claims is interpreted "including but not limited to".

The present invention may suitably comprise, consist or consist essentially of the elements disclosed and may be practiced in the absence of an element not disclosed. For instance, in the method for scavenging hydrogen sulfide and/or mercaptans from a fluid selected from the group consisting of an aqueous phase, a gaseous phase, a hydrocarbon phase and mixtures thereof, the method may consist of, or consist essentially of, contacting the fluid separately with: an effective amount for synergistically scavenging hydrogen sulfide and/or mercaptans of at least one dialdehyde, and an effective amount for synergistically scavenging hydrogen sulfide and/or mercaptans of at least one nitrogen-containing scavenger, where the at least one dialdehyde and the at least one nitrogen-containing scavenger are not mixed together prior to each contacting the fluid. In such a method, the amount of hydrogen sulfide and/or mercaptans scavenged is greater as compared with a method of contacting the fluid with at least one dialdehyde alone and a method of contacting the fluid with at least one nitrogen-containing scavenger alone in equal total amounts as the combined effective amount.

What is claimed is:

1. A method for scavenging a sulfur-containing compound selected from the group consisting of hydrogen sulfide, mercaptans and combinations thereof, from media comprising:
   contacting the media separately with:
      an effective amount for synergistically scavenging the sulfur-containing compound of at least one dialdehyde at least comprising glyoxal, and
      an effective amount for synergistically scavenging the sulfur-containing compound of at least one nitrogen-containing scavenger at least comprising a triazine, where
      the at least one dialdehyde and the at least one nitrogen-containing scavenger are not mixed together prior to each contacting the media,
      where a combined effective amount of dialdehyde and effective amount of nitrogen-containing scavenger in the fluid ranges from about 1 to about 100,000 ppm,
      where the media is selected from the group consisting of an aqueous phase, a gas phase, a hydrocarbon phase, mixtures of a gas and/or hydrocarbon phase with an aqueous phase, the media also comprising the sulfur-containing compound,
   scavenging an amount of the sulfur-containing compound that is greater as compared with an amount scavenged by a method of contacting the media with at least one dialdehyde alone and a method of contacting the media with at least one nitrogen-containing scavenger alone in equal total amounts as the combined effective amount.

2. The method of claim 1 where the at least one dialdehyde also comprises one or more members selected from the group consisting of malondialdehyde, succindialdehyde, glutaraldehyde, phthaldialdehyde, and combinations thereof.

3. The method of claim 1 where the at least one nitrogen-containing scavenger also comprises one or more members selected from the group consisting of monomethylamine (MMA); monoethylamine dimethylamine; dipropylamine; trimethylamine; triethylamine; tripropylamine; monomethanolamine; dimethanolamine; trimethanolamine; diethanolamine (DEA); triethanolamine (TEA); monoisopropanolamine; dipropanolamine; diisopropanolamine; tripropanolamine; N-methylethanolamine; dimethyl ethanol amine; methyl diethanolamine; dimethyl amino ethanol; diamines; imines; imidazolines; hydroxy amino alkyl ethers; morpholines; pyrrolidones; piperidones; alkylpyridines; aminomethylcyclopentylamine; 1-2-cyclohexanediamine, 1,5-pentanediamine, 1,6-hexanediamine, 1H-azepine, hexahydro; 1,4-butanediamine, alkylene polyamine/formaldehyde reaction products; bis-(tertiarybutylaminoethoxy)-ethane (BTEE); ethoxyethoxyethanoltertiarybutylamine (EEETB); polyvalent metal chelates of aminocarboxylic acids; quaternary ammonium salts; polyethylenimine; polyallylamine; polyvinylamine; aminocarbinols; aminals; bisoxazolidines; reaction products of ethylene diamine with formaldehyde; N-butylamine formaldehyde reaction product; and combinations thereof.

4. The method of claim 1 where the weight ratio of at least one dialdehyde to at least one nitrogen-containing scavenger ranges from about 5/95 to about 95/5, where the at least one dialdehyde is in a 40 wt % aqueous solution.

5. The method of claim 1 where the method is practiced in a refinery.

* * * * *